US012651359B1

(12) United States Patent
Zvaigzne et al.

(10) Patent No.: US 12,651,359 B1
(45) Date of Patent: Jun. 9, 2026

(54) SYSTEM AND METHOD FOR AUTO-DIGITALIZATION OF A NEEDLEWORK PATTERN

(71) Applicant: Printful, Inc., Charlotte, NC (US)

(72) Inventors: Eriks Zvaigzne, Riga (LV); Sebastian Piec, Warsaw (PL)

(73) Assignee: Printful, Inc.

( * ) Notice: Subject to any disclaimer, the term of this patent is extended or adjusted under 35 U.S.C. 154(b) by 303 days.

(21) Appl. No.: 18/440,881

(22) Filed: Feb. 13, 2024

(51) Int. Cl.
*G06T 7/40* (2017.01)
*G06T 7/13* (2017.01)
*G06T 7/60* (2017.01)

(52) U.S. Cl.
CPC .................. *G06T 7/40* (2013.01); *G06T 7/13* (2017.01); *G06T 7/60* (2013.01); *G06T 2207/30124* (2013.01)

(58) Field of Classification Search
CPC .... G06T 7/40; G06T 7/13; G06T 7/60; G06T 2207/30124; G06V 30/186; D05B 19/12
USPC ........................................................ 382/164
See application file for complete search history.

(56) References Cited

U.S. PATENT DOCUMENTS

| | | | | |
|---|---|---|---|---|
| 5,311,439 | A * | 5/1994 | Hayakawa ............. | D05B 19/08 |
| | | | | 112/102.5 |
| 5,896,295 | A * | 4/1999 | Matsushita ............ | D05B 19/10 |
| | | | | 112/470.07 |
| 11,301,925 | B1 | 4/2022 | Marhel et al. | |
| 11,995,813 | B2 | 5/2024 | Bassi et al. | |
| 2010/0191364 | A1* | 7/2010 | Goldman ............... | D05B 19/08 |
| | | | | 700/137 |
| 2024/0078652 | A1 | 3/2024 | Bassi et al. | |

* cited by examiner

*Primary Examiner* — Chineyere Wills-Burns
*Assistant Examiner* — Emmanuel Silva-Avina
(74) *Attorney, Agent, or Firm* — Rutan & Tucker, LLP

(57) ABSTRACT

A computerized method for generation of a needlework stitch pattern of an electronic source image is described. Herein, each color layer forming the source image is extracted for separate processing. For each color layer, such a first color layer for example, the objects are separated within the first color layer of the source image. For each object within the first color layer, a shape decomposition process is conducted. This includes determining an object boundary, (2) determining a medial axis of the object, and (3) determining the object's needlework stitch pattern by (a) determining junction points of the object, (b) determining cut points and cut lines, and (c) performing ray casting within separate regions of the object defined by the boundary and the one or more cut lines to identify needle punction coordinates for the object being a portion of the needlework stitch pattern for the electronic source image.

20 Claims, 8 Drawing Sheets

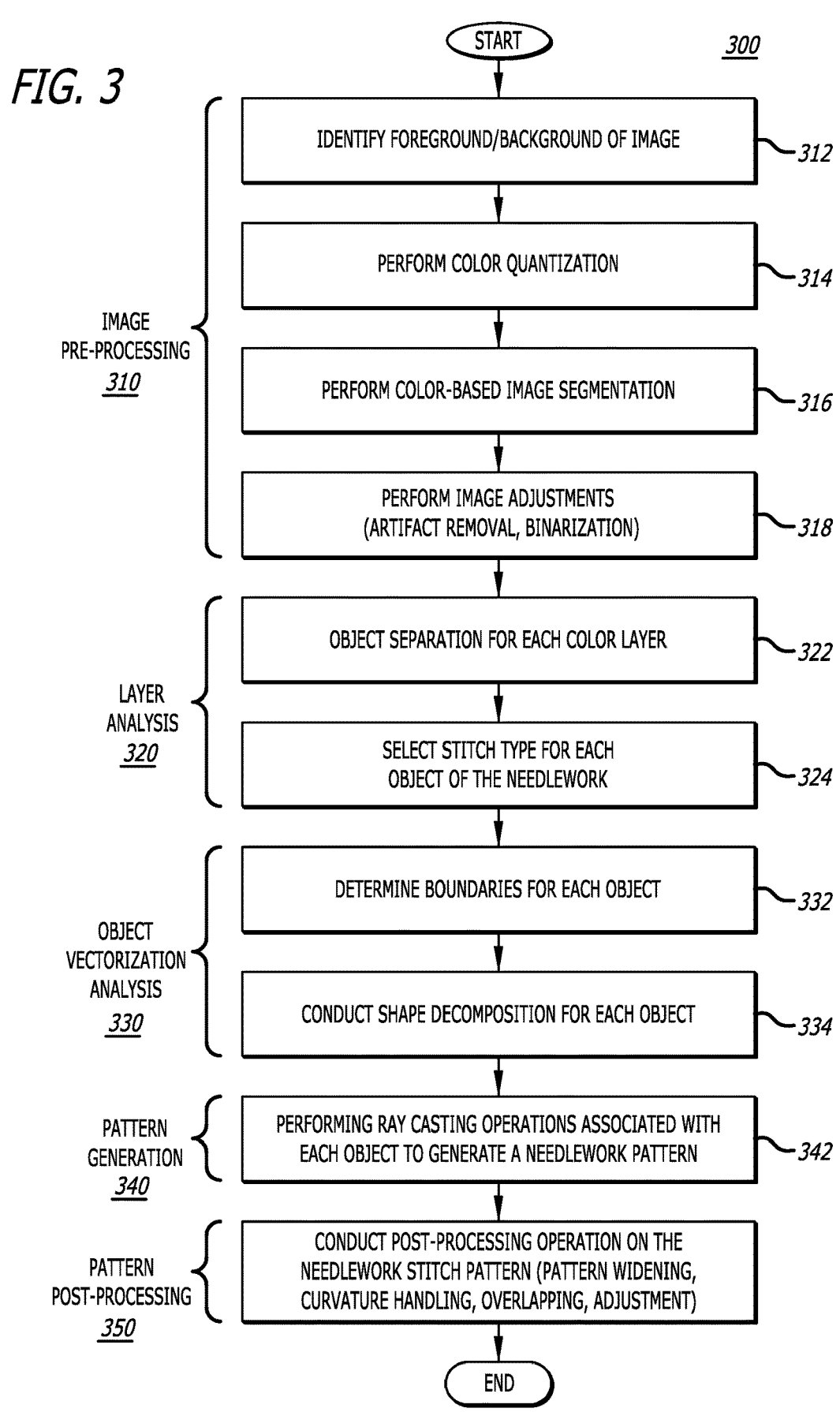

*FIG. 3*

START          *300*

IMAGE PRE-PROCESSING *310*

IDENTIFY FOREGROUND/BACKGROUND OF IMAGE — *312*

PERFORM COLOR QUANTIZATION — *314*

PERFORM COLOR-BASED IMAGE SEGMENTATION — *316*

PERFORM IMAGE ADJUSTMENTS
(ARTIFACT REMOVAL, BINARIZATION) — *318*

LAYER ANALYSIS *320*

OBJECT SEPARATION FOR EACH COLOR LAYER — *322*

SELECT STITCH TYPE FOR EACH
OBJECT OF THE NEEDLEWORK — *324*

OBJECT VECTORIZATION ANALYSIS *330*

DETERMINE BOUNDARIES FOR EACH OBJECT — *332*

CONDUCT SHAPE DECOMPOSITION FOR EACH OBJECT — *334*

PATTERN GENERATION *340*

PERFORMING RAY CASTING OPERATIONS ASSOCIATED WITH
EACH OBJECT TO GENERATE A NEEDLEWORK PATTERN — *342*

PATTERN POST-PROCESSING *350*

CONDUCT POST-PROCESSING OPERATION ON THE
NEEDLEWORK STITCH PATTERN (PATTERN WIDENING,
CURVATURE HANDLING, OVERLAPPING, ADJUSTMENT)

END

*FIG. 6A*
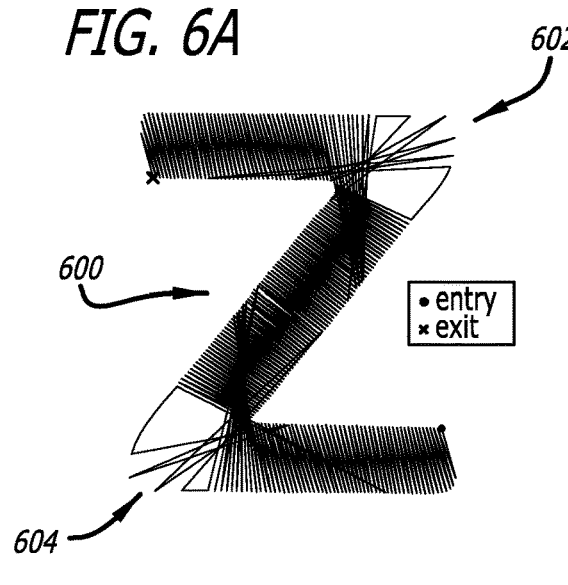
*FIG. 6B*
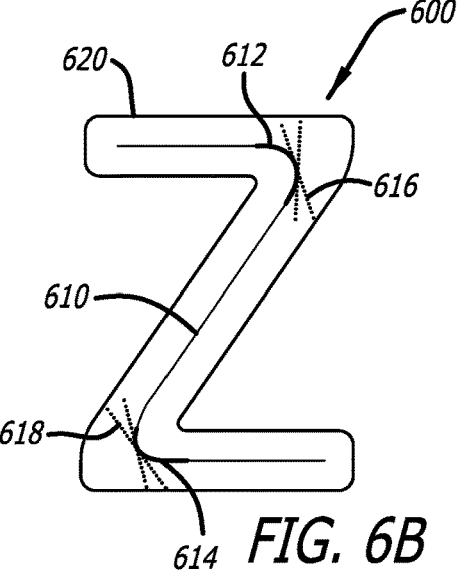
*FIG. 6C*
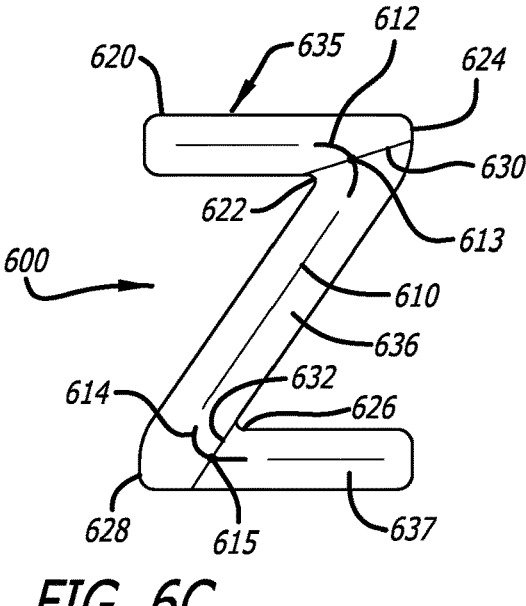
*FIG. 6D*
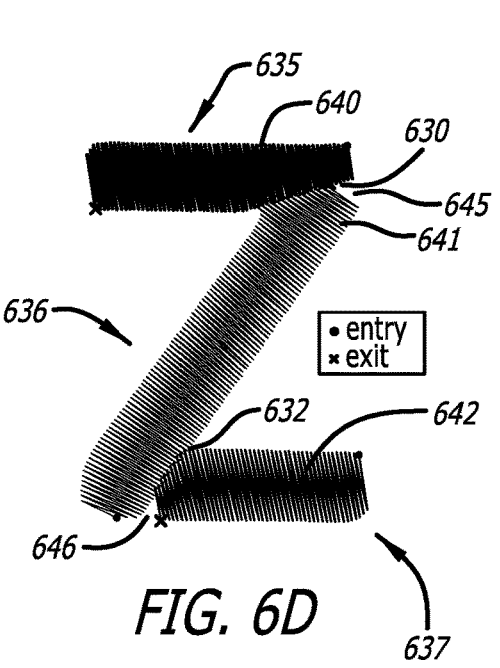
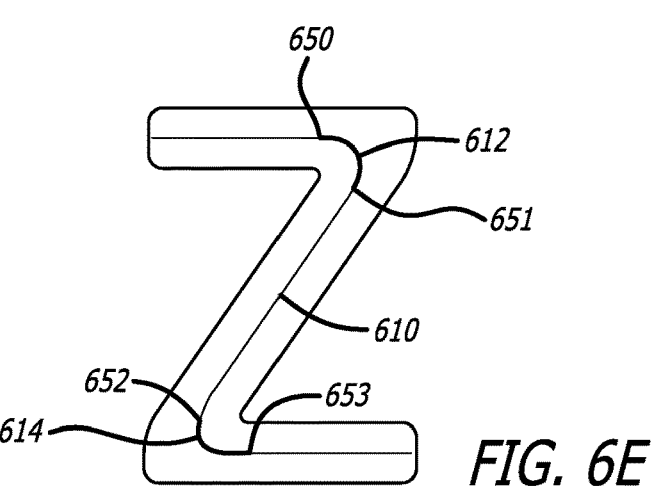
*FIG. 6E*

SYSTEM AND METHOD FOR AUTO-DIGITALIZATION OF A NEEDLEWORK PATTERN

FIELD

Embodiments of the disclosure relate to the field of automated needlework stitch pattern generation. More specifically, one embodiment of the disclosure relates to a system and method for generating a needlework stitch pattern based on analytics conducted on a sourced electronic image of the needlework for loading into a needlework stitching machine.

GENERAL BACKGROUND

Embroidery design programs allow the digital creation and manipulation of designs for a large number of applications. Most embroidery software applications have a similar workflow. First, the installed embroidery software application allows for the selection of an image to be embroidered, where the image may include text characters, illustrative designs, or the like. Once selected, the digitization of the image and exportation of the image as a stitch file or use by an embroidery machine are manually performed by hand, and thus, prone to errors. These errors may cause unnecessary usage of raw materials, such as thread, yarn, or the like, as the stitch files fail to adequately account for overlapping stitching of the embroidered image. This increased usage of raw resources (e.g., thread, etc.) unnecessarily increases the likelihood of embroidery errors that damages product, and reduces the useful life of the stitching (embroidery) machine given that it is performing stitching operations that are unnecessary and/or repetitive. Moreover, it increases production time to generate an acceptable product, which results in higher costs to the customer.

Additionally, lettering tends to account for a significant portion of all embroidered designs. The human eye looks at the letters with a uniform height and tends to appreciate height deviations caused by overlapped stitching (e.g., embroidering, sewing, knitting, etc.) as well as stitching gaps or other stitching irregularities. An automated process and shape decomposition techniques are needed to account for better and more consistent visualization to avoid manual or increased labor to improve the stitched image along with improved needlework machine operability.

BRIEF DESCRIPTION OF THE DRAWINGS

Embodiments of the invention are illustrated by way of example and not by way of limitation in the figures of the accompanying drawings, in which like references indicate similar elements and in which:

FIG. 3 is an exemplary flowchart illustrating a workflow for generating a needlework stitch pattern file that controls operations of a needlework machine in stitching one or more objects forming an image.

FIGS. 6A-6K are exemplary block diagrams illustrating the shape decomposition operations being performed on a color layer of the object represented by a complex letter "Z" with rapidly bending curves.

Figures 1A, 1B:
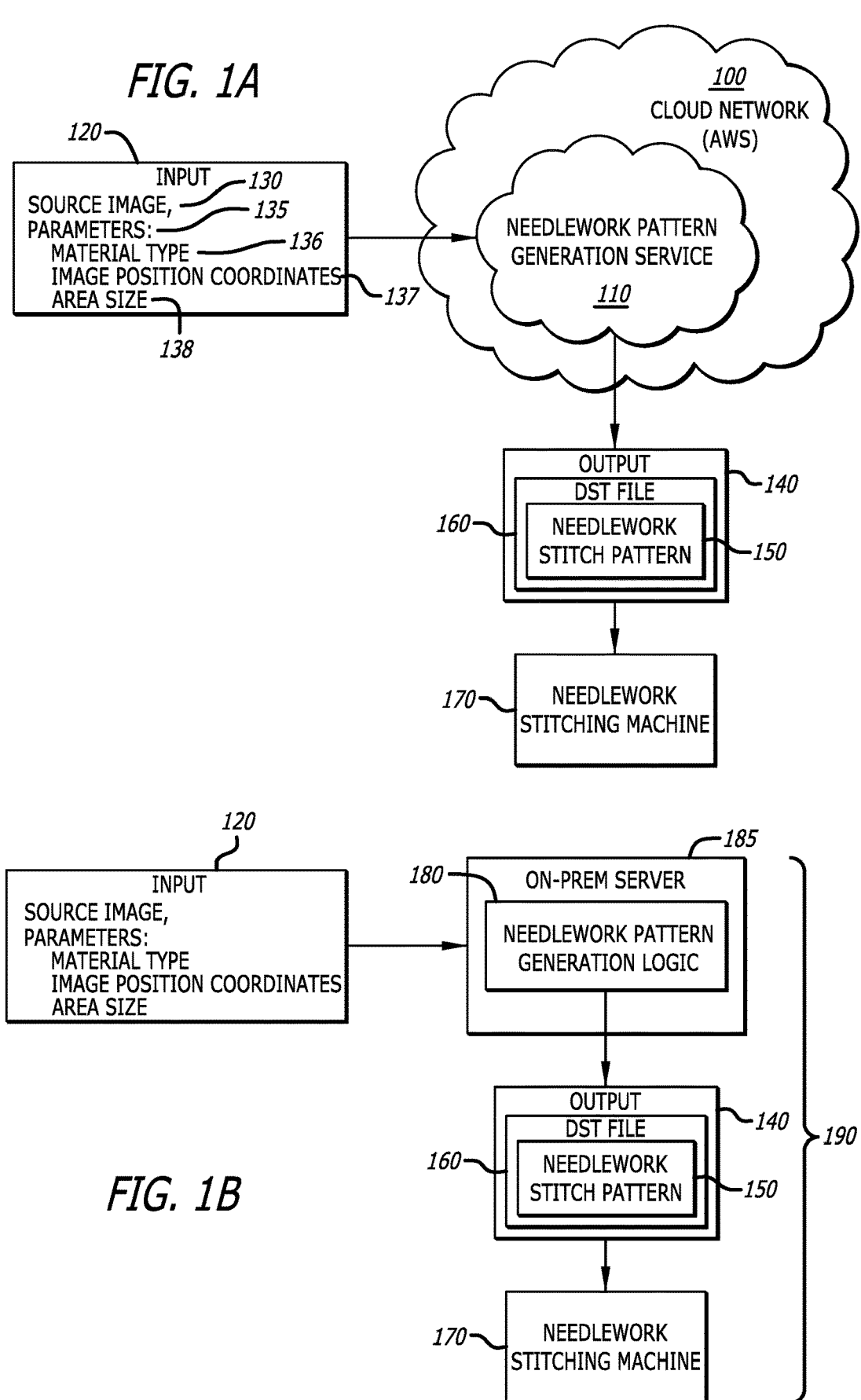
FIG. 1A is a block diagram of an exemplary embodiment of a cloud-based needlework pattern generation service.
FIG. 1B is a block diagram of an exemplary embodiment of the functionality of the needlework pattern generation service of FIG. 1A deployed within an on-premises server.

While each inventive aspect of the disclosure may be subject to various modifications, equivalents, and alternative forms, specific embodiments thereof have been shown by way of example in the drawings and will now be described in detail. It should be understood that each inventive aspect is not limited to the particular embodiments disclosed. On the contrary, the intention is to cover modifications, equivalents, and alternative forms of the inventive aspects within the specific embodiments as each inventive aspect may be implemented into different embodiments than those illustrated.

DETAILED DESCRIPTION

Embodiments of the present disclosure generally relate to a needlework pattern generation service configured to receive an electronic source image and parameters associated with image placement onto a product, such as a clothing item (e.g., a sweatshirt, shirt, jacket, pants, cap, socks, scarf, etc.) or a household item (e.g., blanket, towel, sheets, comforter, etc.) for example. The source image is converted into a needlework stitch pattern file through an image-to-pattern conversion process, which includes logic that supports an image pre-processing phase, a layer analysis phase, an object vectorization phase, a pattern generation phase, and/or a pattern post-processing phase. These phases are conducted to produce a needlework stitch pattern directed to an object within a particular single-color layer of the source image, and these phases are performed iteratively on different objects within that color layer as well as different objects within other color layers forming the source image to collectively produce an image-based (final) needlework stitch pattern. In general, the needlework pattern generation service produces data that controls operability of one or more needlework stitching machines in producing the final needlework stitch pattern, such as a machine-readable file that includes coordinates for the final needlework stitch pattern for example. The file is compatible with one or more needlework stitching machines.

More specifically, the logic performing the image pre-processing phase is configured to simplify the source image targeted for processing to assist in the generation of a needlework stitch pattern with improved visualization and optimized raw material usage over conventional stitch patterns. According to one embodiment of disclosure, the image pre-processing phase may involve foreground/background identification, color quantization, color-based image segmentation, and image adjustments operations.

According to one embodiment of the disclosure, the foreground/background identification is conducted to determine an intended visual perspective of the image, which may influence stitching selection. For example, where the source image is positioned entirely within the foreground, the spacing between stitches may be more closely assigned and/or thicker stitching material may be used to provide more three-dimensional depth effect.

Additionally, color quantization is conducted to alter colors within the electronic source image based on the color of the raw resources (e.g., thread, yarn, filament, etc.) used in the stitching process by the needlework stitching machines (e.g., one or more embroidery machines). For example, where the source image includes "X" colors and the embroidery machine supports "Y" colors (X>>Y), the colors of elements within the source image would be altered to include a color closest to one of the "Y" colors.

The color-based image segmentation is conducted to split the altered source image into separate, single-color layers. Each single-color layer associated with the altered source image is processed independently of the other color layers, and as a result, objects within each single-color layer separately undergo the layer analysis, object vectorization analysis, pattern generation, and pattern post-processing phases.

The image adjustment operations are conducted to remove artifacts to avoid accidental capturing these artifacts within needlework stitch patterns associated with one or more objects within the single-color layer. In some situations, where the object is less than a prescribed size, the object may be treated as an artifact and removed.

Furthermore, image binarization may be conducted to convert the single-color layer into a binary image. Image binarization involves foreground or background determination for every pixel of the binary image, where each pixel whose intensity is above a predetermined threshold is treated as "foreground" (to be embroidered) the rest is the background.

The layer analysis phase may involve object identification and stitch selection. The objects separation involves, for each single-color layer image, identifying and separating objects within that image to conduct object vectorization, pattern generation and stitch pattern postprocessing on each of the objects. The stitch type selection involves a determination of the type of stitching to be used for that object within a needlework stitch pattern for the object. This stitching-type determination may be based on the geometric properties of the object as well as the stitch positioning of the object within the product. The geometric properties may include its desired thickness and/or its spatial properties.

The object vectorization phase may involve object boundary analyses, contour segmentation and vectorization analyses, and shape decomposition analyses. The object boundary analyses are performed to identify the boundary points associated with each object, such as the points associated with a perimeter of the object (hereinafter, "object boundary"). The object boundary analyses are utilized, at least in part, to assist in the identification of needle puncture points as these puncture points normally occur within the object boundary. The contour simplification and vectorization analyses are conducted to create contours that are further simplified, approximated, or converted to parameterized paths to assist in the formation of the object boundary.

Figure 4:
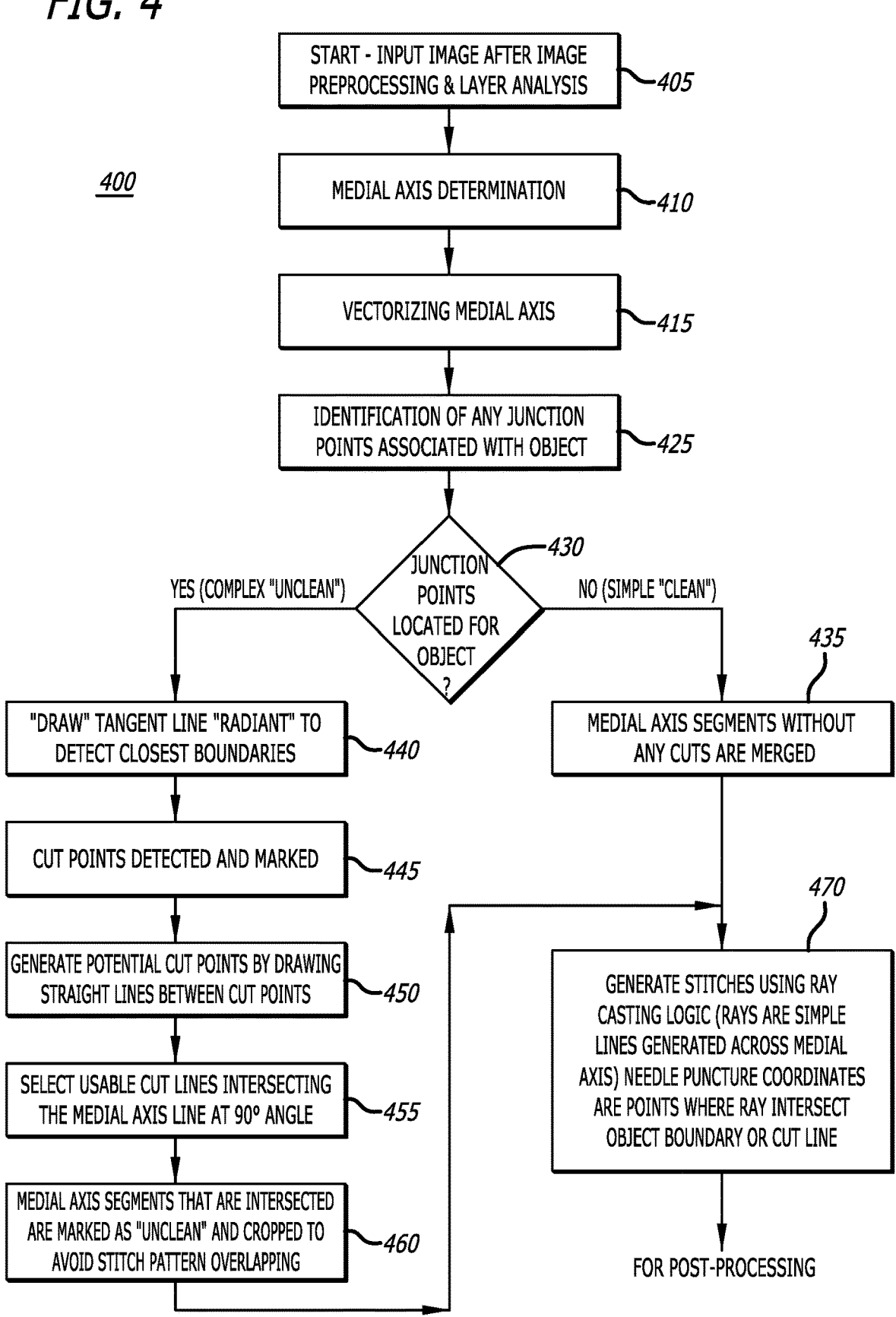
FIG. 4 is an exemplary flowchart illustrating the shape decomposition operations being part of the needlework stitch pattern file generation of FIG. 3.

The shape decomposition analyses involve the determination of the presence (or absence) of junction points within an object under analysis and/or the presence of obtuse angular (sharply curved) movements of a medial axis such as those found in objects/letters like "M", "N", "V", or the like. The absence of junction points identify that the object is a "single-stroked" object, such as the letter "S" for example. The presence of one or more junction points, namely an intersection between two medial axis segments of the object, identifies that the object is a "multi-stroked" object, such as the letter "H" for example as represented in FIGS. 5A-5D. Hence, the shape decomposition analyses further involve the detection of the medial axis segments, which are used to generate cut points and cut lines that identify cropping and stitching patterns for the object under analysis, as illustrated in FIG. 4 and described below.

The pattern generation phase may involve the performance of ray casting operations associated with each object to generate an object-based needlework pattern. This may involve generating rays, namely lines normal to and extending from one or more medial axis segments to a nearest object boundary. The intersections between the rays and a point on the object boundary are considered to be inserted points for one or more needles conducting the stitching operations to represent the needlework. The rays may be extended beyond the medial axis segments to the object boundary, which may extend stitching to the object boundary in lieu of the medial axis that are established during the shape decomposition process.

Lastly, the pattern post-processing phase may involve the generation of the object-based needlework stitch pattern, which may be further post-processed to improve visualization of the stitched image. These post-processing operations may include stitch tilting, pattern widening, high curvature handling, and overlapping stitch adjustment as described below. For example, one post-processing operation may involve applying a prescribed amount of tilt (angular offset) to vertically oriented stitching, where the amount of tilt may be based, at least in part, on (i) the type of material associated with the product upon which the needlework stitch pattern is applied and/or (2) the type of stitching pattern utilized. For instance, a first prescribed amount of tilt may be applied to vertically oriented stitching for a hoodie which may be a different prescribed amount of tilt that the amount of tilt applied to vertically oriented stitching performed on a cap.

I. Terminology

In the following description, certain terminology is used to describe aspects of the invention. In certain situations, the terms "logic" and "component" are representative of hardware, firmware, and/or software that is configured to perform one or more functions. As hardware, the logic (or component) may include circuitry having data processing and/or storage functionality. Examples of such circuitry may include, but are not limited or restricted to a hardware processor, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or component) may be software in the form of one or more software modules, which may be configured to operate as its counterpart circuitry. For instance, a software module may be a software instance that operates as a processor, namely a virtual processor whose underlying operations is based on a physical processor such as an EC2 computing instance within the Amazon® AWS infrastructure for example. Additionally, a software module may include an executable application, a daemon application, an application programming interface (API), a subroutine, a function, a procedure, an applet, a servlet, a routine, source code, a shared library/dynamic load library, or even one or more instructions.

The software module(s) may be stored in any type of a suitable non-transitory storage medium, or transitory storage medium (e.g., electrical, optical, acoustical, or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random-access memory "RAM"); persistent storage such as non-volatile memory (e.g., read-only memory "ROM," power-backed RAM, flash memory, phase-change memory, etc.), a solid-state drive, hard disk drive, an optical disc drive, or a portable memory device. As firmware, the logic (or component) may be stored in persistent storage.

The terms "file" and "message" generally refer to information stored and/or transmitted in a prescribed format, such as a collection (e.g., one or more) of packets or frames or any other collection of bytes or bits having the prescribed format. As an illustrative example, a message may include an image and parameters associated with the orientation or placement of the image on a targeted product. As another illustrative example, a file may be a computer-aided design file (e.g., Data Stitch Tajima (.DST) file) for execution by a needlework stitching machine (e.g., an embroidery machine) for stitching of the image onto the targeted product.

The term "computerized" generally represents that any corresponding operations are conducted by hardware in combination with software and/or firmware. The term "customer" represents an end user, network administrator or another person who controls operability of a network device under analysis.

The term "network device" should be generally construed as physical or virtualized device with data processing capability and/or a capability of connecting to a network, such as a public cloud network (e.g., Amazon Web Service (AWS®), Microsoft Azure®, Google Cloud®, etc.), a private cloud network, or any other network type. Examples of a network device may include, but are not limited or restricted to, the following: a server, a router or other intermediary communication device, an endpoint (e.g., a laptop, a smartphone, a tablet, a desktop computer, a netbook, etc.) or virtualized devices being software with the functionality of the network device. The network device may also be deployed as part any physical or virtualized device communicatively coupled via a device interface (e.g., API(s)).

The terms "stitch," "stitching," "stitched," or other variations thereof may be broadly defined as insertion of material (e.g., thread, yarn, fiber, string, filament, etc.) into a product through any of a variety of insertion techniques such as embroidering, sewing, knitting, or any combination thereof.

The character sets "(s)" and "(ies)" denote one or more. For example, the term "processor(s)" denotes one or more processors.

The term "interconnect" generally refers to a physical or logical communication link (or path) between components or network devices. For example, as a physical communication path, wired and/or wireless interconnects in the form of electrical wiring, optical fiber, cable, bus trace, or a wireless channel using infrared, radio frequency (RF), may be used. Logical communications may involve the exchange of data between two components such as calls or other messages that prompt the return of information (e.g., any time of data, addressing, or commands).

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Needlework Pattern Generation Service Architecture

Referring to FIG. 1A, a block diagram of a first exemplary embodiment of a cloud-based needlework pattern generation service 110 is shown. Herein, the needlework pattern generation service 110 is deployed as a public cloud network 100 such as the Amazon Web Service (AWS) cloud network 100. For example, the needlework pattern generation service 110 may be adapted as machine-learning based (ML-based) software deployed within an AWS Lambda server implemented as part of the AWS cloud network 100. The needlework pattern generation service 110 is configured to (i) receive an input message 120 including an electronic source image 130 and (ii) conduct analytics on the source image 130 to generate a final needlework stitch pattern 150 based on such analytics.

More specifically, the needlework pattern generation service 110 is adapted to receive one or more input messages, such as input message 120. As shown, the input message 120 may include (i) the electronic source image 130 to be stitched into a product and (ii) parameters 135 associated with information concerning the product and/or stitching location for a resultant (post-processed) image. The parameters 135 may include, but are not limited or restricted to the following: (a) material type 136 of the product, (b) image position coordinates 137 within the product, and/or (c) area size 138 representing an area to be occupied by the image 130 within the product. The parameters 135 may also include referred stitch density, configuration related to script execution (e.g., if execution should use all available CPU cores), etc.

According to one embodiment of the disclosure, based on the material type 136, the needlework pattern generation service 110 conducts analytics to account for stitching path deviations caused by the material of the product upon which the source image 130 is to be stitched. Stated differently, the needlework pattern generation service 110 may be configured to perform analytics to account for stitching path deviations experienced by a needle performing the stitching operations and caused by the particular material type. For example, the needlework pattern generation service 110 may be configured to assign a first angular offset between needle punctures of a stitch when the stitching is conducted on a product made of a thick wool material (e.g., coat). The needlework pattern generation service 110 may be configured to assign a second angular offset (less than the first angular offset) between these needle punctures when the product made of thin cotton fabric material (e.g., T-shirt).

Additionally, the image position coordinates 137 may be represented as cartesian coordinates (XY or XYZ), which represents the intended location of the resultant image on the product. For example, after processing, the needlework associated with the source image 130 may be positioned on the pocket of a shirt, where the image position coordinates 137 provide the location of that image with respect to the shirt pocket. Similarly, the area size 138 is adapted to identify the size of the placement (i.e., stitched needlework based on the processed image) to be positioned based on the image position coordinates 137.

Herein, the needlework pattern generation service 110 is configured to receive the electronic source image 130 and generate the final needlework stitch pattern 150 for use by the network stitching machine(s) 170 for placement of the post-processed image in the product. The final needlework stitch pattern 150 constitutes a collection of needle stitch patterns generated on a per color layer and/or per object basis. Each need stitch pattern identifies needle puncture coordinates followed by the needlework stitching machine(s) 170 to embroider, sew or knit the post-processed image as part of the product.

As shown in FIG. 1A, the needlework pattern generation service 110 may be configured to provide an output message 140 to a needlework stitching machine 170. The output message 140 may include the final needlework stitch pattern 150 (e.g., a collection of all object-based needlework stitch patterns for a plurality of color layers forming the source image 130). The final needlework stitch pattern 150 may be provided as part of a file 160 (e.g., a DST file), where the file format may contain stitching commands for different needlework stitching machines 170 such as embroidery machines for example.

Referring to FIG. 1B, a block diagram of a second exemplary embodiment of needlework pattern generation logic 180 is shown. The needlework pattern generation logic 180 is deployed within an on-premises (on-prem) server 185, where the logic 180 has similar functionality as the needlework pattern generation service 110 of FIG. 1A. In particular, the input message 120 is provided the on-prem server 185, which causes creation of the output message 140, which includes the DST file 160 having the final needle stitching pattern 150.

This alternative embodiment may be arranged with the on-prem server 185 being located at a needlework manufacturer 190 to avoid the use of cloud-based services. For instance, some image providers may require enhanced protection of their images (and needlework stitch patterns associated therewith) and may prefer avoidance of uploading the source images into a service located within the cloud network. Instead, the image providers may want to convey the source image (for final network stitch pattern generation) to a secured server 185 at the needlework manufacturer 190.

Figure 2:
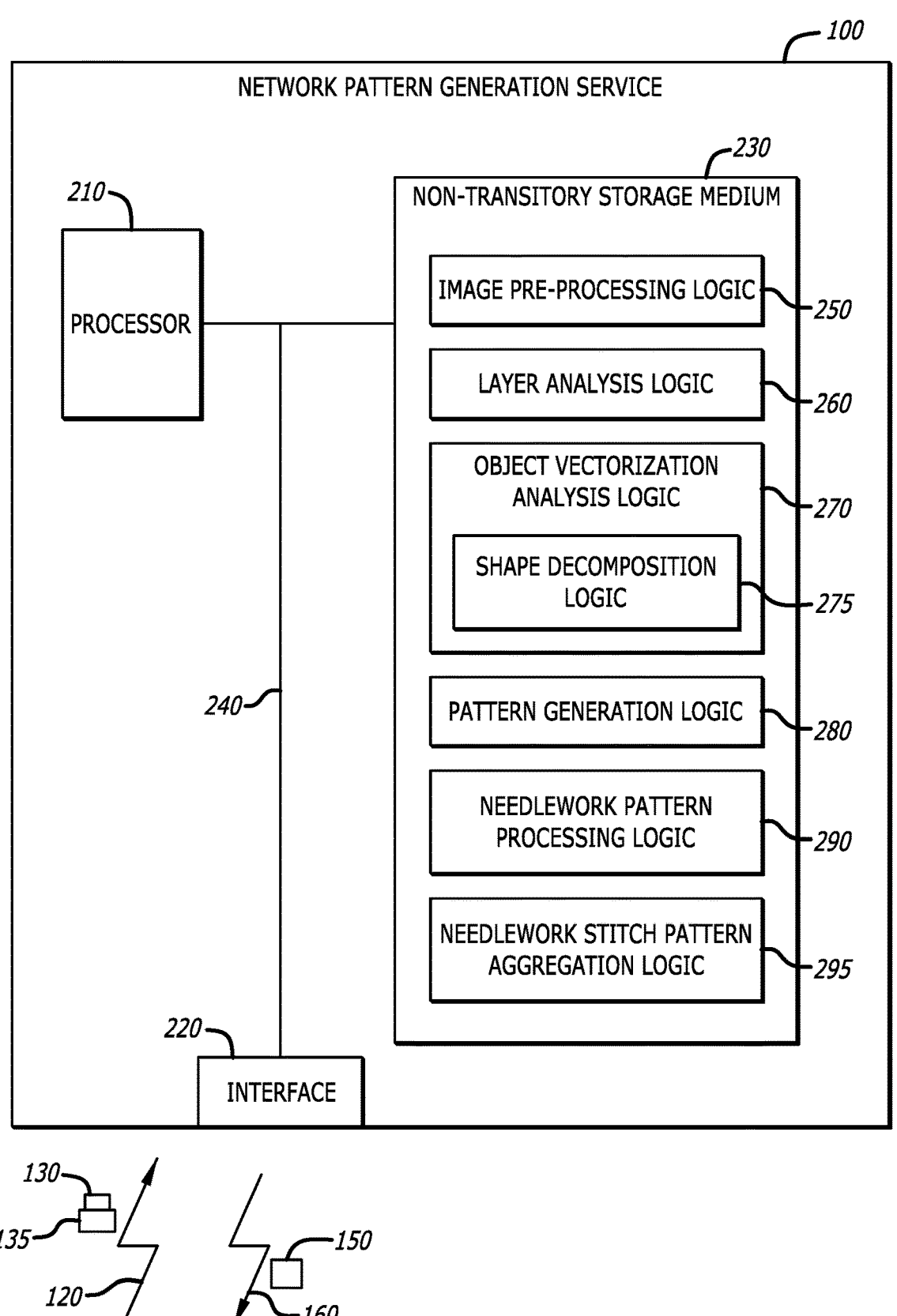
FIG. 2 is a block diagram of an exemplary embodiment of physical and/or logical components of the needlework pattern generation service of FIGS. 1A-1B.

Referring now to FIG. 2, a block diagram of an exemplary embodiment of physical and/or logical components of the needlework pattern generation service 110 of FIG. 1A is shown. It is contemplated that the needlework pattern generation logic 180 of FIG. 1B may be configured to feature the same physical and/or logical components as the needlework pattern generation service 110, but for simplicity sake, the needlework pattern generation service 110 is selected for illustration.

Herein, according to one embodiment of the disclosure, the needlework pattern generation service 110 may be configured with processor(s) 210, an interface 220, a non-transitory storage medium 230, and interconnect(s) 240, where the interconnect(s) 240 provide a communicative coupling between the interface 220, the processor 210, and the non-transitory storage medium 230. The non-transitory storage medium 230 is configured to include image pre-processing logic 250, layer analysis logic 260, object vectorization logic 270, pattern generation logic 280, needlework pattern processing logic 290, and needlework stitch pattern aggregation logic 295. The object vectorization logic 270 is adapted to include shape decomposition logic 275, which conducts analysis on an object implemented as part of a single-color layer as determined by the layer analysis logic 260 and generates a stitching pattern layout for the object under analysis. As a result, needlework stitch patterns for object associated with different color layers of the source image may be determined by the pattern generation logic 280 and the needlework pattern processing logic 290 as described below. The needlework stitch pattern aggregation logic 295 may be configured to collect objected-based needlework stitch patterns associated with the color layers to produce the final needlework stitch pattern 150, which is provided as part of the DST file 160.

According to this embodiment of the disclosure, the interface 220 is configured to receive the input message 120 from an external resource and output the final needlework stitch pattern 150, being part of the DST file 160, to the needlework stitching machine(s) 170. The processor(s) 210 is adapted to execute the logic 250-295 maintained within the non-transitory storage medium 230 in order to generate the final needlework stitch pattern 150 based on the source image 130 and image parameters 135 provided in the input message 120 as illustrated in FIGS. 3-5.

III. Needlework Pattern Generation Workflow

Referring to FIG. 3, an exemplary flowchart illustrating a multi-phase workflow 300 is shown, where the workflow 300 is collectively performed by the image pre-processing logic 250, the layer analysis logic 260, the object vectorization logic 270, the pattern generation logic 280, and the needlework pattern processing logic 290 of FIG. 2. Herein, the workflow 300 is directed to the generation of a needlework stitch pattern for an object under analysis, where an aggregate of needlework stitch patterns for objects associated with different color layers of a source image collectively generate the final needlework stitch pattern 150. The final needlework stitch pattern 150 is implemented as part of the DST file 160, which controls operations of one or more needlework stitching machines 170 in stitching a representation of the source image onto a product.

As illustrated in FIGS. 2-3 and described below, the workflow 300 features an image pre-processing phase 310, a layer analysis phase 320, an object vectorization phase 330, a pattern generation phase 340, and a pattern post-processing phase 350. Herein, the image pre-processing phase 310 features operations conducted by the image processing logic 250 upon execution by the processor(s) 210. During the image pre-processing phase 310, multiple single-color layers associated with the source image 130 may be extracted for separate processing to determine needlework stitch patterns for objects associated with each single-color layer. The operations conducted during the image pre-processing phase 310 may include, but are not limited or restricted to the following processes: (a) foreground and background identification 312, (b) color quantization 314, (c) color-based layer segmentation 316, and/or (d) image adjustment(s) 318.

The foreground/background identification process 312 is conducted to determine the visual perspective associated with each object in relation to the source image as a whole. According to one embodiment of the disclosure, the current foreground/background identification process 312 may involve an assumption that the input graphics is a 4-channel image, where the $4^{th}$ channel represents the background, while the first three depict the foreground. The determined orientation (foreground or background) may be used as a factor in selection of the needlework stitching style, such as a selected stitching tightness that may be used for foreground objects to provide a perception of closeness (e.g., thicker thread and/or tighter stitching may cause a closer visualization for the object than thin thread and/or looser stitching). Additionally, the overlaying of objects associated with different color layers may be used to provide a resemblance of foreground perception.

The color quantization process 314 is conducted to adjust colors within the received source image 130 to the colors of raw materials (e.g., thread, yarn, filament, string, etc.) available to the needlework stitching machine(s) 170 that are being utilized generate a needlework as part of an intended product. Stated differently, where the needlework stitching machine(s) 170 are unable to support all of the colors identified in the source image, the color quantization process 314 is responsible for ensuring that objects associated with the image are represented by colors offered by the needle-work stitching machine(s). According to one embodiment of the disclosure, the color quantization may be performed using the K-means clustering method.

The color-based layer segmentation process 316 is conducted as part of the image pre-processing in order to split the source image into different color layers in which the layer analysis, object vectorization analysis, pattern generation, and pattern post-processing phases are conducted for objects within each single-color layer. Iteratively collected, the stitching patterns associated with objects for each of the single-color layers are utilized to formulate the basis for the final needlework stitch pattern 150 provided to the needle-work stitching machine 170 of FIGS. 1A-1B.

After separation of the color layers, the image adjustment process 318 is conducted in which the color specific images within each color layer undergo at least binarization and artifact removal in order to generate each image layer devoid of any unwanted or unnecessary elements to avoid needle-work irregularities. This adjustment provides a better and more realistic representation to take into account the limitations associated with the needlework machinery.

Conducted by the layer analysis logic 260, the layer analysis phase 320 may be configured to perform a plurality of operations, including (a) an object separation process 322 and (b) a stitch type selection process 324. The object separation process 322 is conducted for each color layer, thereby separating each object pertaining with that color layer. Thereafter, each object within a single-color layer undergoes object vectorization analysis, pattern generation, and pattern post-processing to produce an object-based needlework stitch pattern. Collectively, these object-based stitching patterns form, at least in part, the stitching patterns for the corresponding color layer. The generation of the object-based stitching patterns is iterative for each color layer of the source image to determine stitching patterns of the source image.

Additionally, the stitch type selection process 324 is conducted for each object in the color layer. The stitch type may be selected based on the geometric properties of the objects. For example, the selection of the stitch type may be based on thickness of the stitched portion of the objects, which may be selected to provide depth. The stitch type may be selected to provide a desired visual perception or better efficiency in the use of raw materials or time needed to complete the stitching.

Referring still to FIG. 3, the object vectorization phase 330 is configured to perform two processes, namely a boundary determination process 332 and a shape decomposition process 334. The boundary determination process 332 is configured to determine a boundary or boundaries (hereinafter, "boundary") for each object. The determination of boundary is used to identify the contours associated with the object under analysis to determine the perimeter associated with that object. The object boundary is also used to identify needle puncture points (i.e., needle insertion/removal locations for switching in creation of the object on a product), which tend to be positioned at or near the object boundary. This may involve contour simplification or vectorization in order to create contours that are simplified or approximated or converted into parameterized paths to accomplish and formulate the object boundary more precisely.

The shape decomposition process 334 involves the creation of a medial axis formed by medial axis segments, junctions, cut points in order to assess specifics of the stitching pattern utilized for that particular object, as described in FIG. 4 in more detail. This process 334 is performed to assist in a ray casting process 342 conducted by the pattern generation logic 280 of FIG. 2.

As further shown in FIG. 3, the pattern generation phase 340 involves performance of the ray casting process 342 by the pattern generation logic 280 of FIG. 2, where rays are created normal to medial axis segments within the object and intersect the object boundary. The rays are designed to identify intersection points with the object boundary in order to establish needle entry/exit points pertaining to the object's needlework stitch pattern.

The pattern post-processing phase 350 is conducted to perform post-processing operations to improve quality of the object-based needlework stitch patterns. These improvements may translate into higher-quality stitching and results in better visualization of the image as a needlework. For example, the post-processing operations may include pattern widening to account for the physical needle size where the object stitching pattern is widened by a few pixel points in order to accommodate for the size of the needle so that the object will be represented as its intended size. Additionally, the post-processing operations may involve high curvature handling in which further post-processing may be conducted for segments with curvatures greater than a prescribed value to address more difficult curvatures with respect to needle-work stitch pattern as illustrated in FIGS. 6A-6K. Other post-processing operations may include overlapping pattern adjustments in which gaps that occur in real fabric are closed to account for a few extra stitches that may have existed at column ends to close those gaps. Also, underlay stitches may be generated based on the use of satin pattern in the previous steps to provide a zigzag-like pattern underneath that when combined with the satin pattern produces a more depth-oriented object.

IV. Shape Decomposition Workflow

Referring now to FIG. 4, an exemplary flowchart illustrating shape decomposition operations 400 performed by the shape decomposition logic 275 of FIG. 2 is shown, where the shape decomposition operations 400 assist in the generation of an object-based needlework stitch pattern. Herein, the object-based needlework stitch pattern is a component of the final needlework stitch pattern 150, which is provided to control the needlework stitching machine(s) 170 in creation of a needlework on a targeted product. Herein, after object identification and segmentation for a first color layer and determination of boundar(ies) associated with the object (operation 405), the shape decomposition logic 275 of FIG. 2 is configured to determine a medial axis associated with the object (operation 410). Also, each medial axis undergoes vectorization to create a vector representing the corresponding medial axis (operation 415).

Thereafter, the shape decomposition logic 275 of FIG. 2 is configured to determine junction points associated with the object (operation 425). Each junction point is an intersection of two or more medial axis segments associated with the object under analysis. If no junction points are detected, the shape decomposition logic 275 determines that the medial axis segment(s) do not feature any cuts points that partition the object into simpler elements (operations 430 & 435). As a result, the pattern generation logic 280 of FIG. 2 performs ray casting to identify the needle punction coordinates being the intersection between the medial axis segment(s) and the object boundary (operation 470).

Upon determining one or more junction points associated with the object are present, the shape decomposition logic 275 of FIG. 2 is configured to identify candidate "cut" points associated with the object, where each "cut" point represents a position in which the stitching is discontinued (operations 430 & 445). According to one embodiment of the disclosure, each "cut" point is determined by producing radial, tangential lines each junction point to identify intersection points between the radial tangential lines and the boundary of the object (operation 440). The cut points are positioned on the boundary of the object.

After the cut points have been established, the shape decomposition logic 275 of FIG. 2 further computes potential cut lines extending between the cut points (operation 450). Herein, the potential cut lines are designated to segment the object into simpler sub-objects in which the type/direction of the stitching may be modified. According to one embodiment of the disclosure, a subset of the potential cut lines (e.g., one or more cut lines from a plurality of potential cut lines) may be selected, where these selected cut lines extending from the object boundary are normal (perpendicular) to a medial axis (operation 455).

Thereafter, the medial axis segment or segments that are intersected by the selected cut lines are tagged to be cropped, namely only a portion of the medial axis segment between the cut lines is retained (operation 460). The cropping of the portion of the medial axis segment is conducted to avoid stitch pattern overlapping. Thereafter, the pattern generation logic 280 of FIG. 2 performs ray casting to identify the needle punction coordinates being the intersection between the medial axis segment(s) and the object boundary (operation 470).

Figure 5A:
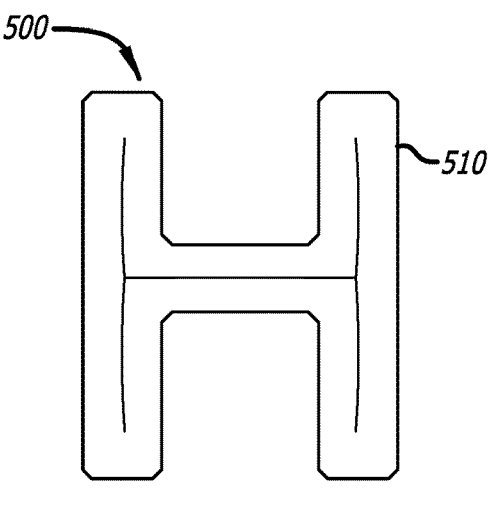
FIGS. 5A-5I are block diagrams illustrating exemplary shape decomposition operations being performed on a color layer of the object represented by a complex letter "H".

Referring to FIGS. 5A-5I, a first illustrative embodiment enumerating the shape decomposition operations being performed by the shape decomposition logic 275 of FIG. 2 within the needlework pattern generation services/logic 100/180 on a color layer of an object 500 represented by a complex letter "H" is shown. As shown in FIG. 5A, a medial axis 510 for the object 500 featured with a boundary 510 is created. This medial axis may be created with an object thinning method such as Zhang-Suen algorithm. The medial axis 510 of the object 500 may undergo vectorization to create a vector representing the corresponding medial axis.

Figure 5B:
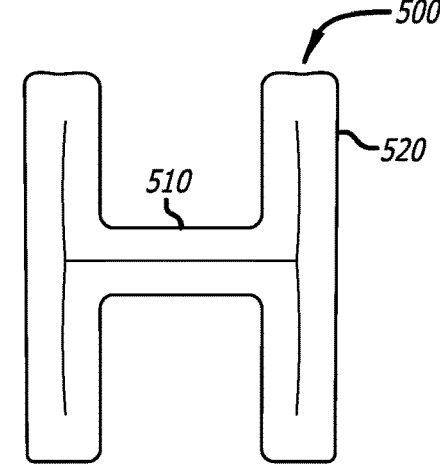
Figure 5C:
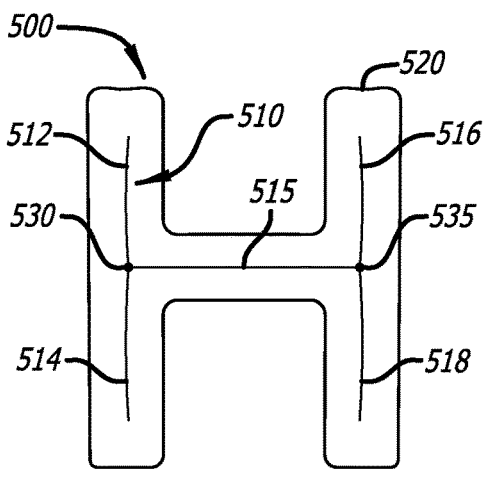

As shown in FIG. 5C, the shape decomposition logic 275 of FIG. 2 may be configured to determine one or more junction points 530 and 535 associated with the object 500. A first junction point 530 is located at an intersection of a first medial axis segment 512, a second medial axis segment 514, and a third medial axis segment 515. A second junction point 535 is located at an intersection of the third medial axis segment 515, a fourth medial axis segment 516 and a fifth medial axis segment 518.

Figure 5D:
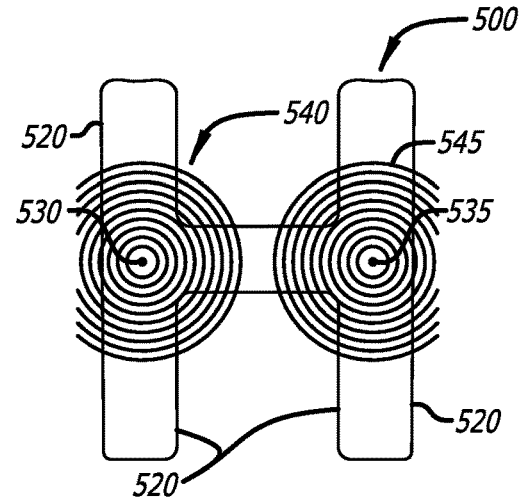
Figure 5E:
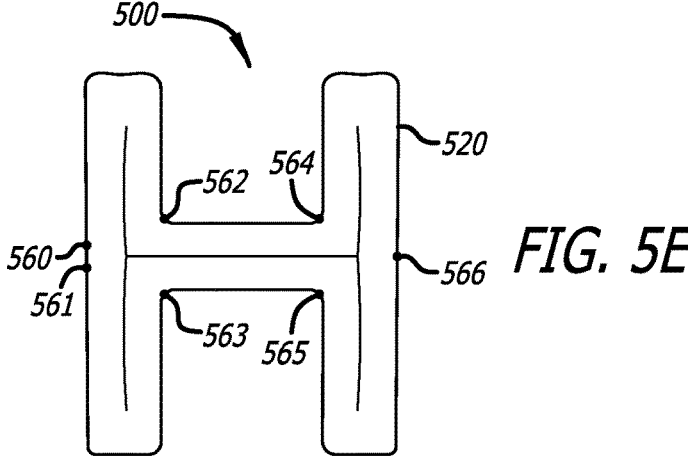

Upon determining the junction points 530 and 535 associated with the object 500, as shown in FIG. 5D, the shape decomposition logic 275 of FIG. 2 is configured to identify candidate "cut" points associated with the object 500 by performing logical computations equivalent to radiating tangent lines 540 and 545 from each junction point 530 and 535 and identify cut points at points of intersection between the tangent lines 540 and 545 and the object boundary 520. As shown in FIG. 5E, the cut points 560-566 represents positions along the boundary line 520 in which the stitching is discontinued.

Figure 5F:
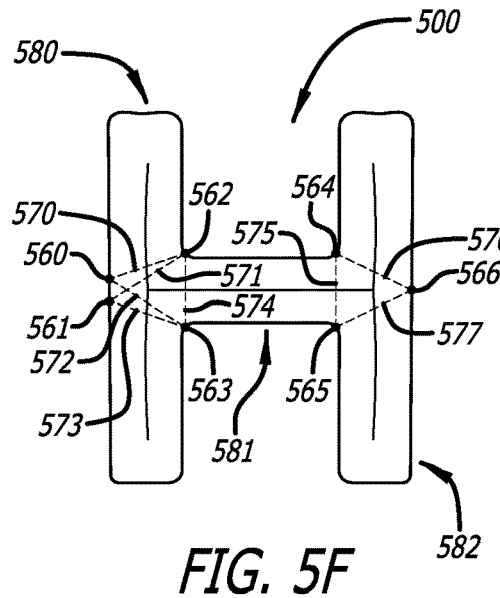

Referring now to FIG. 5F, after the cut points 560-566 have been established, the shape decomposition logic 275 of FIG. 2 further computes potential cut lines 570-577 extending between the neighboring cut points 560-566. Herein, the potential cut lines 570-577 are designated to segment the object 500 into simpler sub-objects, such as a first sub-object 580 (first vertical portion), a second sub-object 581 (horizontal portion) and a third sub-object 582 (second vertical portion) formed from cut lines 574 and 575. According to this embodiment of the disclosure, cut lines 574 and 575 may be selected based on these cut lines extending perpendicular from the medial axis 510 towards the boundary line 550 of the object 500.

Figure 5G:
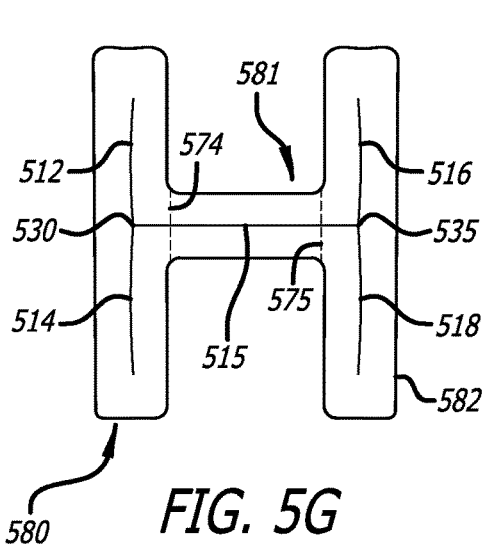
Figure 5H:
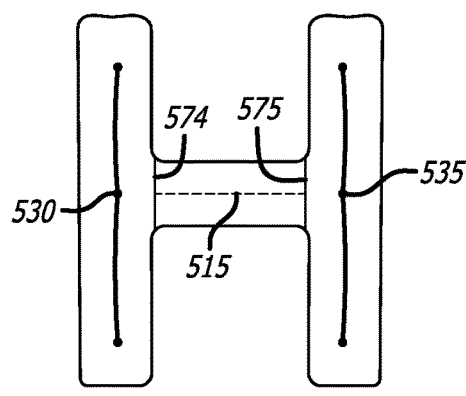

Thereafter, as shown in FIG. 5G, the medial axis segments 512, 514, 516 and 518 that are not intersecting any of the selected cut lines 574 and 575 are tagged as "clean," where the "clean" medial axis segments 512, 514, 516 and 518 are merged. In contrast, the medial axis segment 515 intersecting the selected cut lines 574 and 575 are tagged as "unclean," where the unclean, medial axis segment 515 is cropped so that portions of the medial axis segment 515, situated between the cut line 574 and junction point 530 and cut line 575 and the junction points 530 and 535 respectively, are removed as shown in FIG. 5H. The cropping is conducted to avoid stitch pattern overlapping.

Figure 5I:
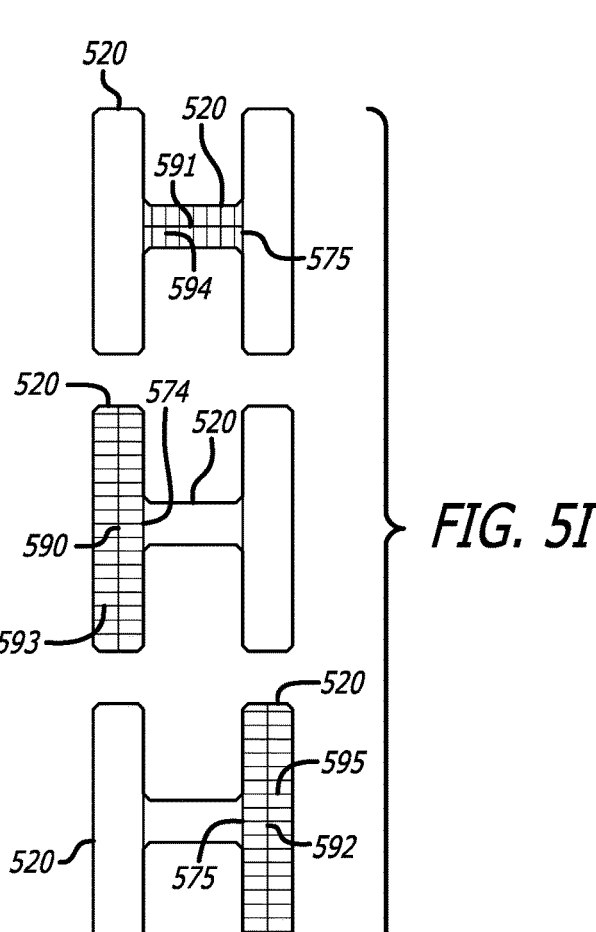

As a result, as shown in FIG. 5I, the result of the shape decomposition process are three single stroke" satin columns 590-592 (one horizontal and two vertical) to form the "H" letter. Thereafter, each of these columns 590 and 592 is digitized separately similar to the ray casting operations and the medial axis extending directionally to the boundary 520 or a cut line. Thereafter, rays 593-595 normal to the medial axis associated with each column 590-592 are formed to identify needle punction points at points in which the rays interest either the object boundary line 520 or a cut line 574 and 575.

Figure 6F:
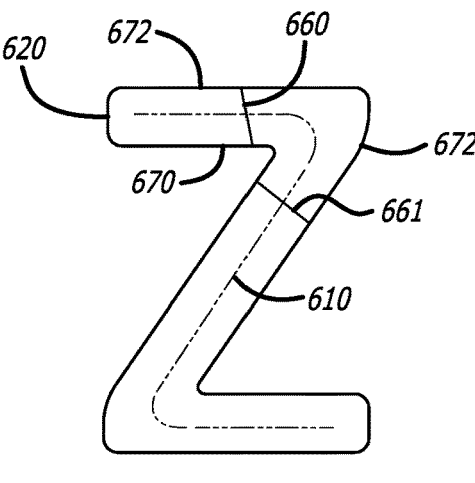

Referring now to FIGS. 6A-6K, a second illustrative embodiment enumerating the shape decomposition operations being performed by the shape decomposition logic 275 of FIG. 2 on a color layer of an object 600 represented by a complex letter "Z" with rapidly bending sections is shown. As shown in FIG. 6A, for images with rapidly bending regions 602 and 604 (e.g., boundary line segments with an angle of curvature greater than a prescribed value (e.g., a prescribed angular change over a series of constant length line sub-segments, such as a resultant angular change of 80-90 degrees for example)), the ray-casting technique shown in FIG. 5I (extending rays from the medial axis of the object 500 to its boundary or cut lines to establish needle points) is ineffectual, which leads to invalid (incomplete) stitching within regions 602 and 604. Therefore, additional pattern post-processing operations may be performed by the shape decomposition logic 275 of FIG. 2 to assess whether the image features rapidly bending sections and perform a handle needlework pattern repair scheme as illustrated in FIGS. 6B-6D or FIGS. 6E-6K.

Initially, similar to analysis of the "H" letter illustrated in FIGS. 5A-5B, a medial axis 610 for the object 600 having a boundary 620 has been created. The medial axis 610 of the object 600 undergoes vectorization to create a vector representing the corresponding medial axis.

As shown in FIG. 6B, in accordance with a first needlework pattern repair scheme, the shape decomposition logic 275 of FIG. 2 may be configured to detect highly curved sections 612 and 614 of the medial axis 610. According to one embodiment of the disclosure, detection of the highly curved section 612 may be conducted by (i) computing tangential lines 616 over the medial axis 610, notably at section 612 and (ii) determining whether angular changes in the direction of neighboring tangential lines 616 exceed a prescribed value. If so, where the changes in direction identify that the section 612 is experiencing an angle of curvature greater than a selected angular change (e.g., series of sub-segments of the section 612 experiencing an angular deviation), the section 612 constitutes a "highly curved" section. The same operations are conducted throughout the medial axis 610, notably with tangent lines 618 at section 614 of the medial axis 610.

Thereafter, as shown in FIG. 6C, cut lines 630 and 632 are formed to intersect the highly curved sections 612 and 614 of the medial axis 610. More specifically, a first cut line 630 may be logically determined to extend between opposite sides 622 and 624 of the object boundary 620 to intersect a mid-point 613 of the highly curved section 612. The angle of the first cut line 630 is normal to the curvature of the section 612 at the midpoint 613. Similarly, a second cut line 632 may be logically determined to extend between opposite sides 626 and 628 of the object boundary 620 to intersect a mid-point 615 of the highly curved section 614. The angle of the second cut line 632 is normal to the curvature of the section 614 at the midpoint 615. As a result, the "Z" object 600 is decomposed into three (3) regions, namely a first object region 635, a second object region 636, and a third object region 637.

Referring to FIG. 6D, for the illustrative "Z" object 600, the newly generated object regions (or "columns") 635-637 include two horizontal-oriented columns 635 and 637 and a diagonal column 636. Each of the object columns 635-637 is digitized separately similar to the ray casting operations and the medial axis extending directionally to the boundary 620 or one of the cut lines 630 and 632. Thereafter, rays 640-642 normal to the medial axis 610 associated with each column 635-637 are formed to identify needle punction points at points in which the rays interest either the object boundary 620 or a cut line 630 or 632. The open areas 645-646 (premature end of the stitching pattern) may be managed through a generated cross-switch or may be managed with extrapolation and slight bending of the medial axis segments (trimmed with newly generated cut lines, 630 and 632).

Referring now to FIG. 6E, in accordance with a second needlework pattern repair scheme, the shape decomposition logic 275 of FIG. 2 may be configured to detect the highly curved sections 612 and 614 of the medial axis 610 using tangent lines as described above. However, in lieu of determining mid-points of the highly curved sections 612 and 614 as illustrated in FIG. 6B, the shape decomposition logic 275 determines ends 650-653 of the highly curved sections 612 and 614 (i.e., starting and sending points where the change in direction of the tangent line exceeds a prescribed angular value). These ends 650-653 identify placement for cut-lines 660-663 generated at both ends of the sections 612 and 614 of FIG. 6E.

Figure 6G:
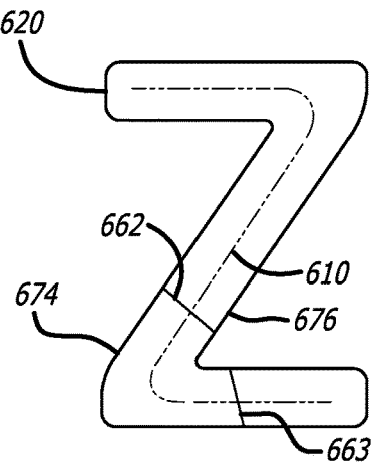

More specifically, as illustrated in FIG. 6F, a first cut line 660 may be logically determined to extend between opposite sides 670 and 672 of the object boundary 620 at an angle normal to an angle projecting from the first end 650 of the section 612 of the medial axis 610. Similarly, a second cut line 661 may be logically extended between opposite sides 670 and 672 of the object boundary 620 at an angle normal to an angle projecting from the second end 651 of the section 612 of the medial axis 610. Likewise, as illustrated in FIG. 6G, a third cut line 662 may be logically determined to extend between opposite sides 674 and 676 of the object boundary 620 at an angle normal to an angle projecting from the third end 652 of the section 614 of the medial axis 610. A fourth cut line 663 may be logically extended between opposite sides 674 and 676 of the object boundary 620 at an angle normal to an angle projecting from the fourth end 653 of the section 614 of the medial axis 610.

Figure 6H:
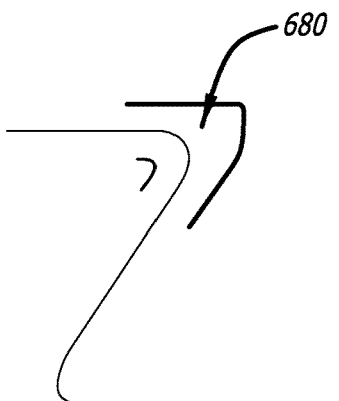
Figure 6I:
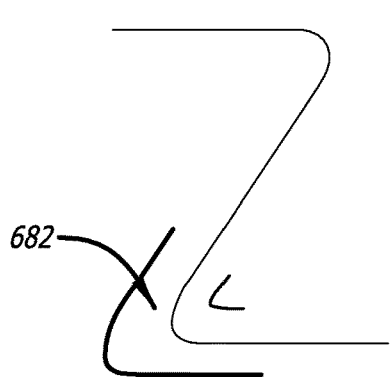
Figure 6J:
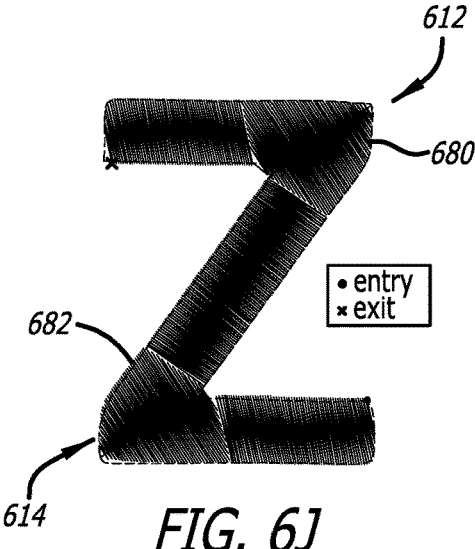
Figure 6K:
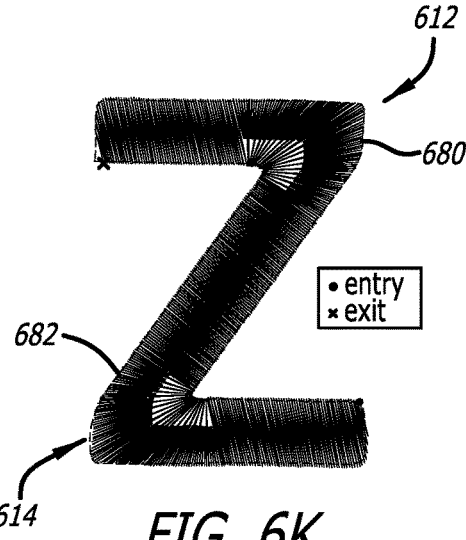

As shown in FIGS. 6H-6I, as a result of this determination, two regions 680 and 682 are formed in which a new needlework stitch pattern is to be generated. As described above, these regions 680 and 682 are digitized. As shown in FIG. 6J, one digitization approach would involve conducting a determination of equidistant points along the boundaries of the regions, which may occur through ray casting within these specific regions 680 and 682. More specifically, this ray-casting method still involves looking for intersections with the boundaries and cut lines 660-663. However, ray generation does not involve travel through the medial axis 610, but through the line connecting the middles of the inner (shorter) and the outer (longer) segments (regions 680 and 682). As shown in FIG. 6K, another digitization approach involves a determination of a zigzag pattern along portions of the medial axis 610 within the regions 680 and 682. This creates coverage within the highly curved sections 612 and 614 of the object 600.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method for generation of a needlework stitch pattern of an electronic source image based on information extracted from a message including the source image, the computerized method comprising:

extracting each color layer of a plurality of color layers forming the source image for separate processing in determining the needlework stitch pattern, wherein the plurality of color layers including a first color layer;

separating objects within the first color layer of the source image; and for an object within the first color layer, conducting a shape decomposition process including (i) determining a boundary of the object, (ii) determining a medial axis associated with the object within the boundary, and (iii) determining a needlework stitch pattern for the object by at least (a) determining junction points associated with the object, (b) determining cut points and one or more cut lines based on locations of the cut points, and (c) performing ray casting within separate regions of the object defined by the boundary and the one or more cut lines to identify needle punction coordinates for the object within the needlework stitch pattern.

2. The computerized method of claim 1, wherein the determining of the cut points is based, at least in part, on a positioning of the junction points.

3. The computerized method of claim 2, wherein the determining of the one or more cut lines is conducted in response to determining the junction points associated with the object.

4. The computerized method of claim 2, wherein the medial axis comprises a plurality of medial axis segments and each of the junction points is an intersection between at least two medial axis segments of the plurality of medial axis segments.

5. The computerized method of claim 4, wherein the determining of the cut points includes generating radial, tangential lines at each junction point in which the cut points denote an intersection between the radial tangential lines and the boundary of the object.

6. The computerized method of claim 5, wherein the determining of the one or more cut lines extend perpendicular from the medial axis to a cut point of the cut points.

7. The computerized method of claim 4, wherein prior to the performing of the ray casting, the method further comprising:

identifying any of the plurality of medial axis segments intersecting any of the one or more cut lines; and cropping a medial axis segment of the plurality of medial axis segments intersecting a first cut line of the one or more cut lines so that portions of the medial axis between a junction point of the junction points and the first cut line are cropped to produce graphical columns representing the separate regions of the object.

8. The computerized method of claim 7, wherein the performing ray casting within the separate regions of the object comprises (i) digitizing the separate regions directionally extending the medial axis to the boundary, (ii) generating rays normal to the medial axis associated with each region to identify the needle punction points for the needlework stitch pattern for the object.

9. The computerized method of claim 8 further comprising:

performing iterative operations of the shape decomposition process for each object of the first color layer and each object of remaining color layers of the plurality of color layers to produce the needlework stitch pattern for the electronic source image.

10. The computerized method of claim 9 further comprising:

generating a file including the needlework stitch pattern for transmission to a needlework stitching machine to embroider a representation of the electronic source image on a product.

11. A needlework pattern generation service for determining a needlework stitch pattern for an electronic source image, comprising:

a processor; and a non-transitory storage medium communicatively coupled to the processor, the non-transitory storage medium includes image pre-processing logic that, upon execution by the processor, is configured to extract each color layer of a plurality of color layers forming the electronic source image, wherein the plurality of color layers including a first color layer, layer analysis logic that, upon execution by the processor, is configured to separate objects within the first color layer of the source image for processing, object vectorization logic that, upon execution by the processor, is configured for each object within the first color layer, conducting a shape decomposition process including (i) determining a boundary of an object, (ii) determining a medial axis associated with the object within the boundary, and (iii) determining a needlework stitch pattern for the object by at least (a) determining junction points associated with the object and (b) determining cut points based on a positioning of the junction points and determining one or more cut lines based on locations of the cut points, and pattern generation logic that, upon execution by the processor, is configured to perform ray casting within regions of the object defined by the boundary and the one or more cut lines to identify needle punction coordinates for the object within the needlework stitch pattern for the object.

12. The needlework pattern generation service of claim 11, wherein the determining of the cut points by the object vectorization logic is in response to determining the junction points associated with the object.

13. The needlework pattern generation service of claim 11, wherein the object vectorization logic includes shape decomposition logic.

14. The needlework pattern generation service of claim 13, wherein the medial axis comprises a plurality of medial axis segments and each of the junction points is an intersection between at least two medial axis segments of the plurality of medial axis segments.

15. The needlework pattern generation service of claim 14, wherein the shape decomposition logic, upon execution by the processor, is configured to determine the cut points by at least generating radial, tangential lines at each junction point in which the cut points denote an intersection between the radial, tangential lines, and the boundary of the object.

16. The needlework pattern generation service of claim 14, wherein the shape decomposition logic, upon execution by the processor, is configured to determine the one or more cut lines extend perpendicular from the medial axis to a cut point of the cut points.

17. The needlework pattern generation service of claim 14, wherein the shape decomposition logic, upon execution by the processor, is further configured to (i) identify any of the plurality of medial axis segments intersecting any of the one or more cut lines, and (ii) crop a medial axis segment of the plurality of medial axis segments intersecting a first cut line of the one or more cut lines so that portions of the medial axis between a junction point of the junction points and the first cut line are cropped to produce graphical columns representing the separate regions of the object.

18. The needlework pattern generation service of claim 14, wherein the pattern generation logic that, upon execution by the processor, is further configured to perform ray casting within the separate regions of the object by at least (i) digitizing the separate regions directionally extending the medial axis to the boundary and (ii) generating rays normal to the medial axis associated with each region to identify the needle punction points for the needlework stitch pattern for the object.

19. The needlework pattern generation service of claim 18, wherein the image pre-processing logic, the layer analysis logic, the object vectorization logic and the pattern generation logic are configured, upon execution by the processor, to performing iterative operations of the shape decomposition process for each object of the first color layer and each object of remaining color layers of the plurality of color layers to produce the needlework stitch pattern for the electronic source image.

20. The needlework pattern generation service of claim 19 further comprising:

post-processing logic that, upon execution by the processor, is configured to generate a file including the needlework stitch pattern for transmission to a needlework stitching machine to embroider a representation of the electronic source image on a product.

\* \* \* \* \*